United States Patent
Flannery et al.

(10) Patent No.: US 6,545,209 B1
(45) Date of Patent: Apr. 8, 2003

(54) MUSIC CONTENT CHARACTERISTIC IDENTIFICATION AND MATCHING

(75) Inventors: Frank P. Flannery, Bellevue, WA (US); Paul D. Deeds, Seattle, WA (US); Christian E. Schrock, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/899,490

(22) Filed: Jul. 5, 2001

Related U.S. Application Data

(60) Provisional application No. 60/215,807, filed on Jul. 5, 2000.

(51) Int. Cl.[7] .............................. G10H 1/40; G10H 7/00
(52) U.S. Cl. .............................. 84/609; 84/611; 84/612
(58) Field of Search .................. 84/609–614; 434/307 A

(56) References Cited

U.S. PATENT DOCUMENTS

| | | | | |
|---|---|---|---|---|
| 5,486,645 A | * | 1/1996 | Suh et al. ...................... | 84/610 |
| 5,616,876 A | * | 4/1997 | Cluts ............................ | 84/609 |
| 5,877,445 A | * | 3/1999 | Hufford et al. ........... | 84/609 X |

OTHER PUBLICATIONS

Appelbaum, M. et al., "Agile—A CAD/CAM/CAE Interface Language," *Society of Manufacturing Engineers: Technical Paper*, 1984, MS84–182, 1–19.

Bendix, L. et al., "CoEd—A Tool for Versioning of Hierarchical Documents," B. Magnusson (Ed.), *System Configuration Management, Proc. ECOOP'98 SCM–8 Symposium*, Brussels, Belgium, Jul. 20–21, 1998.

Biglari–Abhari, M. et al., "Improving Binary Compatibility in VLIW Machines through Compiler Assisted Dynamic Rescheduling," *IEEE*, 2000, 386–393.

Boneh, D. et al., "Collusion–secure fingerprinting for digital data," *IEEE Trans. Information Theory*, 1998, 44(5), 1897–1905.

Bratsberg, S.E., "Unified Class Evolution by Object–Oriented Views," Pernul, G. et al. (Eds.), *Entity–Relationship Approach—ER'92. Proc. 11th International Conference on the Entity–Relationship Approach*, Karlsruhe, Germany, Oct. 7–9, 1992, 423–439.

Bresin, R. et al., "Synthesis and decoding of emotionally expressive music performance," *IEEE SMC'99 Conference Proceedings. 1999 IEEE Int'l Conf. On Systems, Man, and Cybernetics*, 1999, vol. 4, 317–322.

(List continued on next page.)

*Primary Examiner*—Stanley J. Witkowski
(74) *Attorney, Agent, or Firm*—Woodcock Washburn LLP

(57) ABSTRACT

A system and methods for matching media entities to associate closely related media entities are provided. In connection with a system that convergently merges perceptual and digital signal processing analysis of media entities for purposes of classifying the media entities, various means are provided match media entities using aggregation and non-aggregation matching. In an illustrative implementation, various factors representative of inherent characteristics of the media entities are employed and processed to generate data sets having closely related and/or similarly situated media entities. Once a media matching is performed on a library of media entities, the results of the media match may be persisted for the user from experience to experience.

20 Claims, 6 Drawing Sheets

OTHER PUBLICATIONS

Camurri, A. et al., "Multi–Paradigm Software Environment for the Real–Time Processing of Sound, Music and Multimedia," *Knowledge–Based Systems*, 1994, 7(2), 114–126.

Camurri, A. et al., "Music and Multimedia Knowledge Representation and Reasoning—The Harp System," *Computer Music J.*, 1995, 19(2sum), 34–58.

Camurri, A., "Music content processing and multimedia: Case studies and emerging applications of intelligent interactive systems," *J. New Music Res.*, 1999, 28(4), 351–363.

Clamen, S.M., "Schema Evolution and Integration", *Distributed and Parallel Databases 2*, 1994, 2, 101–126.

Cohen, W.W. et al., "Web–collaborative filtering: recommending music by crawling the Web," *Computer Networks*, 2000, 33, 685–698.

Conradi, R. "Version Models for Software Configuration Management," *ACM Computing Surveys*, Jun. 1998, 30(2), 232–282.

Conradi, R. et al., "Change–Oriented Versioning: Rationale and Evaluation," *Third Int'l. Workshop—Software Engineering & Its Applications*, Dec. 3–7, 1990, Toulouse, France, pp. 97–108.

Craner, P.M., "New Tool for an Ancient Art: The Computer and Music," *Computers and Humanities*, 1991, 25, 303–313.

De Castro, C. et al., "Schema Versioning for Multitemporal Relational Databases," *Information Systems*, 1997, 22(5), 249–290.

DeRoure, D.C. et al., "Content–based navigation of music using melodic pitch contours," *Multimedia Systems*, 2000, 8, 190–200.

Drossopoulou, S. et al., "A Fragment Calculus –towards a model of Separate Compilation, Linking and Binary Compatibility," $14^{th}$ *Symposium on Logic in Computer Science—IEEE Computer Society*, Jul. 2–5, 1999, Los Alamitos, California, pp 147–156.

Eisenberg, M. "Programmable applications: exploring the potential for language/interface symbiosys," *Behaviour & Information Technology*, 1995, 14(1), 56–66.

Franconi, E. et al., "A Semantic Approach for Schema Evolution and Versioning in Object–Oriented Databases," J. Lloyd et al., (Eds.), *Computational Logic—CL 2000: Proc. First Int'l. Conference*, Jul. 24–28, 2000, London, UK, pp. 1048–1062.

Gal, A. et al., "A Multiagent Update Process in a Databased with Temporal Data Dependencies and Schema Versioning," *IEEE Transactions on Knowledge and Data Engineering*, Jan./Feb. 1998, 10(1), 21–37.

Gentner, T. et al., "Perceptual classification based on the component structure of song in European starlings," *J. Acoust. Soc. Am.*, Jun. 2000, 107(6), 3369–3381.

Goddard, N.J., "Using the "C" programming language for interface control," *Laboratory Microcomputer*, Autumn 1982, 15–22.

Goldman, C.V. et al., "NetNeg: A connectionist–agent integrated system for representing musical knowledge," *Annals of Mathematics and Artificial Intelligence*, 1999, 25, 69–90.

Goldstein, T.C. et al., "The Object Binary Interface– C++ Objects for Evolvable Shared Class Libraries," *USENIX Association—Proc. of the 1994 USENIC C++ Conference*, Apr. 11–14, 1994, Cambridge, MA, 1–19.

Hori, T. et al., "Automatic music score recognition/play system based on decision based neural network," *1999 IEEE Third Workshop on Multimedia Signal Processing*, Ostermann, J. et al. (eds.), 1999, 183–184.

Kieckhefer, E. et al., "A computer program for sequencing and presenting complex sounds for auditory neuroimaging studies," *J. Neurosc. Methods*, Aug., 2000, 101(1), 43–48.

Kirk, R. et al., "Midas–Milan—an open distributed processing system for audio signal processing," *J. Audio Enginerr. Soc.*, 1996, 44(3), 119–129.

Krulwich, B., "Lifestyle finder—Intelligent user profiling using large–scale demographic data," *AI Magazine*, 1997, 18(2sum), 37–45.

Lethaby, N., "Multitasking with C++," *Proc. of the $5^{th}$ Annual Embedded Systems Conference*, Oct. 5–8, 1993, Santa Clara, CA, 2, 103–120.

Lewine, D., "Certifying Binary Applications," *Proc. of the Spring 1992 EurOpen & USENIX Workshop*, Apr. 6–9, 1992, Jersey, Channel Islands, 25–32.

Li, D. et al., "Classification of general audio data for content–based retrieval," *Pattern Recogn. Letts.*, 2001, 22(5), 533–544.

Liang, R.H. et al., "Impromptu Conductor—A Virtual Reality System for Music Generation Based on Supervised Learning," *Displays*, 1994, 15(3), 141–147.

Logrippo, L., "Cluster analysis for the computer–assisted statistical analysis of melodies," *Computers Humanities*, 1986, 20(1), 19–33.

Moreno, P.J. et al., "Using the Fisher Kernal Method for Web Audio Classification," *2000 IEEE Int'l Conf. On Acoustics, Speech, and Signal Processing, Proceedings*, 2000, vol. 4, 2417–2420.

Morrison, I. et al., "The Design and Prototype Implementation of a "Structure Attribute" Model for Tool Interface Within an IPSE," *Microprocessing and Microprogramming*, 1986, 18, 223–240.

Oiwa, Y. et al., "Extending Java Virtual Machine with Integer–Reference Conversion," *Concurrency: Practice and Experience*, May 2000, 12(6), 407–422.

Oussalah, C. et al., "Complex Object Versioning," *Advanced Information Systems Engineering—Proc. $9^{th}$ Int'l. Conference, CaiSE'97*, Jun. 16–20, 1997, Catalonia Spain, 259–272.

Pesavento, M. et al., "Unitary Root–MUSIC with a Real–Valued Eigendecomposition: A Theoretical and Experimental Performance Study," *IEEE Transactions on Signal Processing*, May 2000, 48(5), 1306–1314.

Pirn, R., "Some Objective and Subjective Aspects of 3 Acoustically Variable Halls," *Appl. Acoustics*, 1992, 35(3), 221–231.

Proper, H.A., "Data schema design as a schema evolution process", *Data & Knowledge Engineering*, 1997, 22, 159–189.

Roddick, J.F., "A survey of schema versioning issues for database systems," *Information and Software Technology*, 1995, 37(7), 383–393.

Rose, E. et al., "Schema versioning in a temporal object–oriented data model," *Int'l. Journal on Artificial Intelligence Tools*, 1998, 7(3), 293–318.

Serra, A., "New solutions for the transmission of music. Possible methods in view of the reduction of the pass band," *Revista Espanola de Electronica*, Jul., 1976, 23(260), 34–35 (English language abstract attached).

Smith, M.W.A., "A relational database for the study and quantification of tempo directions in music," *Comput. Humanities*, 1994, 28(2), 107–116.

Speiser, J.M. et al., "Signal processing computations using the generalized singular value decomposition," *Proceedings of SPIE—The Int'l Socity for Optical Engineering. Real Time Signal Processing VII*, Bellingham, WA, 1984, 47–55.

Surveyer, J., "C+ = (C–Sharp = = Microsoft Java++)? True:False;", *Java Report*, Oct. 2000, 5 pages.

Tsotras, V. et al., "Optimal Versioning of Objects," *Eighth Int'l. Conference on Data Engineering—IEEE Computer Society*, Feb. 2–3, 1992, Tempe, Arizona, 358–365.

Urtado, C. et al., "Complex entity versioning at two granularity levels," *Information Systems*, 1998, 23(3/4), 197–216.

Wieczerzycki, W., "Advanced versioning mechanisms supporting CSCW environments," *Journal of Systems Architecture*, 1997, 43, 215–227.

Yoder, M.A. et al., "Using Multimedia and the Web to teach the theory of digital multimedia signals," *Proceedings. Frontiers in Education*, 1995 $25^{th}$ *Annual Conference. Engineering Education for the $21^{st}$ Century, IEEE*, Budny, D. et al. (eds.), Nov. 1–4, 1995, vol. 2, Atlanta, GA.

Zhang, T. et al., "Audio content analysis for online audio-visual data segmentation and classification," *IEEE Trans. on Speech and Audio Processing*, May, 2001, 9(4), 441–457.

Zhang, T. et al., "Heuristic approach for generic audio data segmentation and annotation," *Proceedings ACM Multimedia 99*, 1999, 67–76.

* cited by examiner

MUSIC CONTENT CHARACTERISTIC IDENTIFICATION AND MATCHING

CROSS REFERENCE TO RELATED APPLICATION

This application is related to and claims priority under 35 U.S.C. §119(e) to U.S. Provisional Application Ser. No. 60/215,807, filed Jul. 5, 2000, entitled "MUSIC MATCHING PROCESS," the contents of which are hereby incorporated by reference in their entirety. This application also relates to U.S. patent application Ser. Nos. 09/900,230, 09/900,059 through 09/928,004.

FIELD OF THE INVENTION

The present invention relates to a system and method to allow music matching for delivering music to users of computing devices connected to a network.

BACKGROUND OF THE INVENTION

Classifying information that has subjectively perceived attributes or characteristics is difficult. When the information is one or more musical compositions, classification is complicated by the widely varying subjective perceptions of the musical compositions by different listeners. One listener may perceive a particular musical composition as "hauntingly beautiful" whereas another may perceive the same composition as "annoyingly twangy."

In the classical music context, musicologists have developed names for various attributes of musical compositions. Terms such as adagio, fortissimo, or allegro broadly describe the strength with which instruments in an orchestra should be played to properly render a musical composition from sheet music. In the popular music context, there is less agreement upon proper terminology. Composers indicate how to render their musical compositions with annotations such as brightly, softly, etc., but there is no consistent, concise, agreed-upon system for such annotations.

As a result of rapid movement of musical recordings from sheet music to pre-recorded analog media to digital storage and retrieval technologies, this problem has become acute. In particular, as large libraries of digital musical recordings have become available through global computer networks, a need has developed to classify individual musical compositions in a quantitative manner based on highly subjective features, in order to facilitate rapid search and retrieval of large collections of compositions.

Musical compositions and other information are now widely available for sampling and purchase over global computer networks through online merchants such as Amazon.com, Inc., barnesandnoble.com, cdnow.com, etc. A prospective consumer can use a computer system equipped with a standard Web browser to contact an online merchant, browse an online catalog of pre-recorded music, select a song or collection of songs ("album"), and purchase the song or album for shipment direct to the consumer. In this context, online merchants and others desire to assist the consumer in making a purchase selection and desire to suggest possible selections for purchase. However, current classification systems and search and retrieval systems are inadequate for these tasks.

A variety of inadequate classification and search approaches are now used. In one approach, a consumer selects a musical composition for listening or for purchase based on past positive experience with the same artist or with similar music. This approach has a significant disadvantage in that it involves guessing because the consumer has no familiarity with the musical composition that is selected.

In another approach, a merchant classifies musical compositions into broad categories or genres. The disadvantage of this approach is that typically the genres are too broad. For example, a wide variety of qualitatively different albums and songs may be classified in the genre of "Popular Music" or "Rock and Roll."

In still another approach, an online merchant presents a search page to a client associated with the consumer. The merchant receives selection criteria from the client for use in searching the merchant's catalog or database of available music. Normally the selection criteria are limited to song name, album title, or artist name. The merchant searches the database based on the selection criteria and returns a list of matching results to the client. The client selects one item in the list and receives further, detailed information about that item. The merchant also creates and returns one or more critics' reviews, customer reviews, or past purchase information associated with the item.

For example, the merchant may present a review by a music critic of a magazine that critiques the album selected by the client. The merchant may also present informal reviews of the album that have been previously entered into the system by other consumers. Further, the merchant may present suggestions of related music based on prior purchases of others. For example, in the approach of Amazon.com, when a client requests detailed information about a particular album or song, the system displays information stating, "People who bought this album also bought . . . " followed by a list of other albums or songs. The list of other albums or songs is derived from actual purchase experience of the system. This is called "collaborative filtering."

However, this approach has a significant disadvantage, namely that the suggested albums or songs are based on extrinsic similarity as indicated by purchase decisions of others, rather than based upon objective similarity of intrinsic attributes of a requested album or song and the suggested albums or songs. A decision by another consumer to purchase two albums at the same time does not indicate that the two albums are objectively similar or even that the consumer liked both. For example, the consumer might have bought one for the consumer and the second for a third party having greatly differing subjective taste than the consumer. As a result, some pundits have termed the prior approach as the "greater fools" approach because it relies on the judgment of others.

Another disadvantage of collaborative filtering is that output data is normally available only for complete albums and not for individual songs. Thus, a first album that the consumer likes may be broadly similar to second album, but the second album may contain individual songs that are strikingly dissimilar from the first album, and the consumer has no way to detect or act on such dissimilarity.

Still another disadvantage of collaborative filtering is that it requires a large mass of historical data in order to provide useful search results. The search results indicating what others bought are only useful after a large number of transactions, so that meaningful patterns and meaningful similarity emerge. Moreover, early transactions tend to over-influence later buyers, and popular titles tend to self-perpetuate.

In a related approach, the merchant may present information describing a song or an album that is prepared and distributed by the recording artist, a record label, or other entities that are commercially associated with the recording. A disadvantage of this information is that it may be biased, it may deliberately mischaracterize the recording in the hope of increasing its sales, and it is normally based on inconsistent terms and meanings.

In still another approach, digital signal processing (DSP) analysis is used to try to match characteristics from song to song, but DSP analysis alone has proven to be insufficient for classification purposes. While DSP analysis may be effective for some groups or classes of songs, it is ineffective for others, and there has so far been no technique for determining what makes the technique effective for some music and not others. Specifically, such acoustical analysis as has been implemented thus far suffers defects because 1) the effectiveness of the analysis is being questioned regarding the accuracy of the results, thus diminishing the perceived quality by the user and 2) recommendations can only be made if the user manually types in a desired artist or song title from that specific website. Accordingly, DSP analysis, by itself, is unreliable and thus insufficient for widespread commercial or other use.

Accordingly, there is a need for an improved method of classifying information that is characterized by the convergence of subjective or perceptual analysis and DSP acoustical analysis criteria. With such a classification technique, it would be further desirable to leverage song-by-song analysis and matching capabilities to automatically and/or dynamically personalize a network-based experience for a user. In this regard, there is a need for a mechanism that can enable a client to automatically retrieve information about one or more musical compositions, user preferences, ratings, or other sources of mappings to enhance an experience for listener(s).

SUMMARY OF THE INVENTION

In view of the foregoing, the present invention provides a system and methods that allow for automatic matching of music based on various music characteristics for delivery to participating users. In connection with a system that convergently merges perceptual and digital signal processing analysis of media entities for purposes of classifying the media entities in an effort to provide relevant media to participating users, the present invention provides various means to generate playlists, perform 'soundslike' searches, and, media matching based on meta-data, such as artist or title matching. Techniques for providing for weighting media to perform desired matches are also provided. Once a music matching is performed for a library of media to create a roll-up table is performed, the results of the music matching process may be persisted for a user from experience to experience.

Other features of the present invention are described below.

BRIEF DESCRIPTION OF THE DRAWINGS

The system and methods for the automatic transmission of new, high affinity media are further described with reference to the accompanying drawings in which.

DETAILED DESCRIPTION OF PREFERRED EMBODIMENTS

Overview

The present invention provides systems and methods to closely relate media entities based on one or more inherent media entity characteristic(s). Closely related and/or similarly situated (i.e. "matched") media entities may subsequently be grouped to create play lists. For example, commonly assigned U.S. patent application Ser. No. 09/905,011, filed Jul. 13, 2001, entitled "Dynamic Playlist of Media", herein after playlist generation, describes novel techniques for dynamically generating playlists of closely related media entities. Alternatively, the operations of the present invention may be employed to perform searches among an aggregated list of media entities (e.g. songs), such that similarity searches (e.g. sounds-like or looks like searches) may be performed, or further, exact media entity author and/or title searches may be performed. The dynamic playlist generation system enables the creation and distribution of playlists to participating users wherein closely related media entities are gathered for inclusion within a given generated playlist. The present invention, among other implementations, powers the playlist generation system by providing systems and methods that associate closely related and/or similarly situated media entities with each other using inherent media entity characteristics.

Exemplary Computer and Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 1:
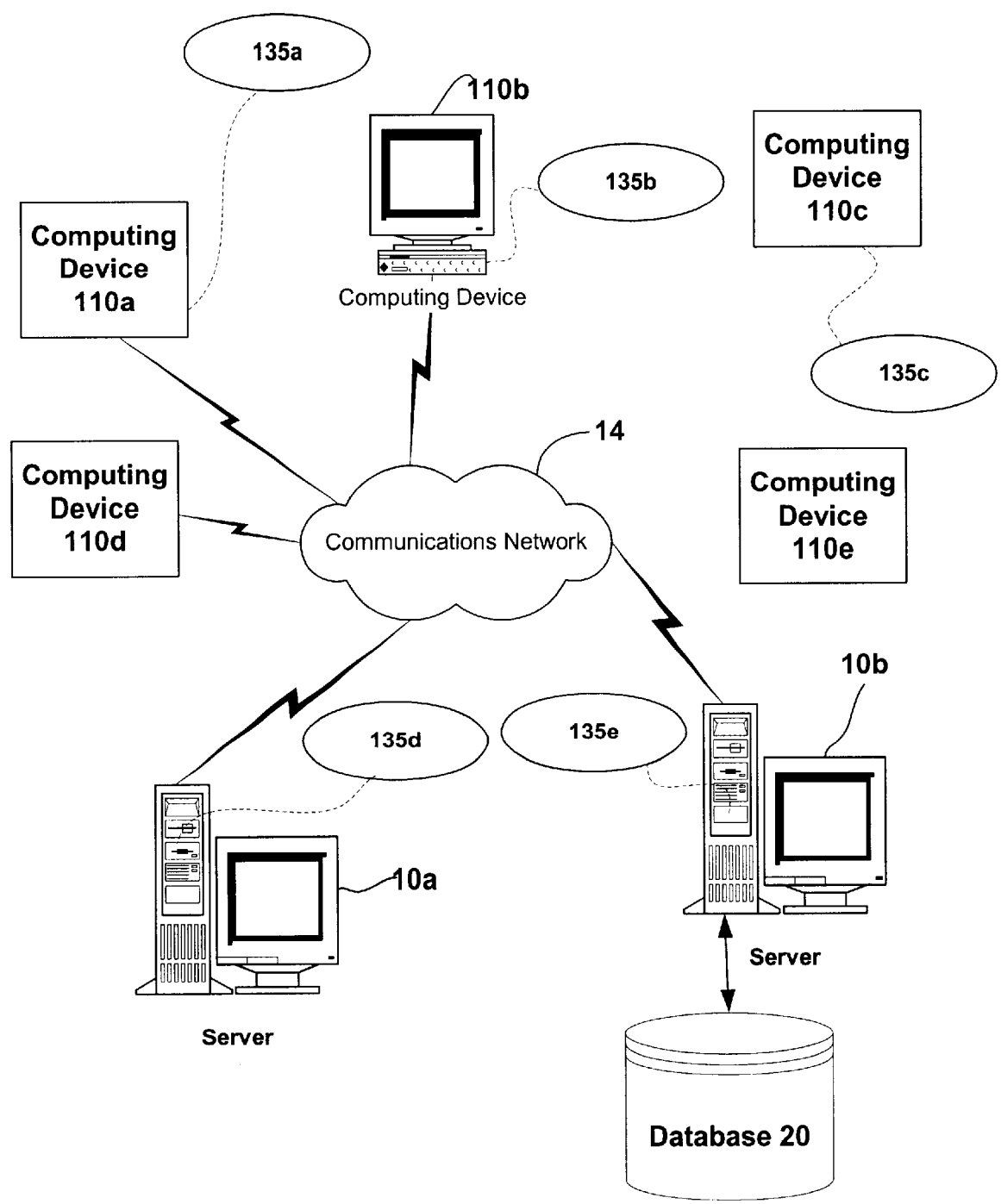
FIG. 1 is a block diagram representing an exemplary network environment in which the present invention may be implemented.

FIG. 1 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 in accordance with the present invention, such as a database 20 for storing classification information, music and/or software incident thereto. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Classification

In accordance with one aspect of the present invention, a unique classification is implemented which combines human and machine classification techniques in a convergent manner, from which a canonical set of rules for classifying music may be developed, and from which a database, or other storage element, may be filled with classified songs. With such techniques and rules, radio stations, studios and/or anyone else with an interest in classifying music can classify new music. With such a database, music association may be implemented in real time, so that playlists or lists of related (or unrelated if the case requires) media entities may be generated. Playlists may be generated, for example, from a single song and/or a user preference profile in accordance with an appropriate analysis and matching algorithm performed on the data store of the database. Nearest neighbor and/or other matching algorithms may be utilized to locate songs that are similar to the single song and/or are suited to the user profile.

Figure 2:
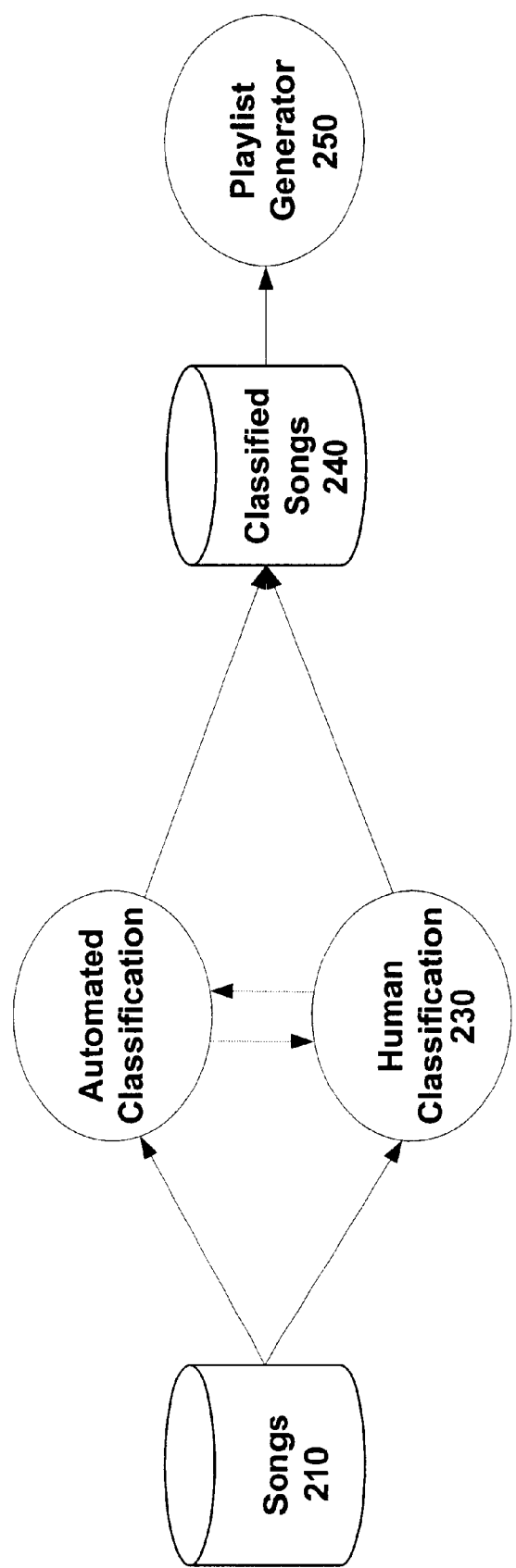
FIG. 2 is a high level block diagram representing the media content classification system utilized to classify media, such as music, in accordance with the present invention.

FIG. 2 illustrates an exemplary classification technique in accordance with the present invention. Media entities, such as songs 210, from wherever retrieved or found, are classified according to human classification techniques at 220 and also classified according to automated computerized DSP classification techniques at 230. 220 and 230 may be performed in either order, as shown by the dashed lines, because it is the marriage or convergence of the two analyses that provides a stable set of classified songs at 240. As discussed above, once such a database of songs is classified according to both human and automated techniques, the database becomes a powerful tool for generating songs with a playlist generator 250. A playlist generator 250 may take input(s) regarding song attributes or qualities, which may be a song or user preferences, and may output a playlist, recommend other songs to a user, filter new music, etc. depending upon the goal of using the relational information provided by the invention. In the case of a song as an input, first, a DSP analysis of the input song is performed to determine the attributes, qualities, likelihood of success, etc. of the song. In the case of user preferences as an input, a search may be performed for songs that match the user preferences to create a playlist or make recommendations for new music. In the case of filtering new music, the rules used to classify the songs in database 240 may be leveraged to determine the attributes, qualities, genre, likelihood of success, etc. of the new music. In effect, the rules can be used as a filter to supplement any other decision making processes with respect to the new music.

Figure 3:
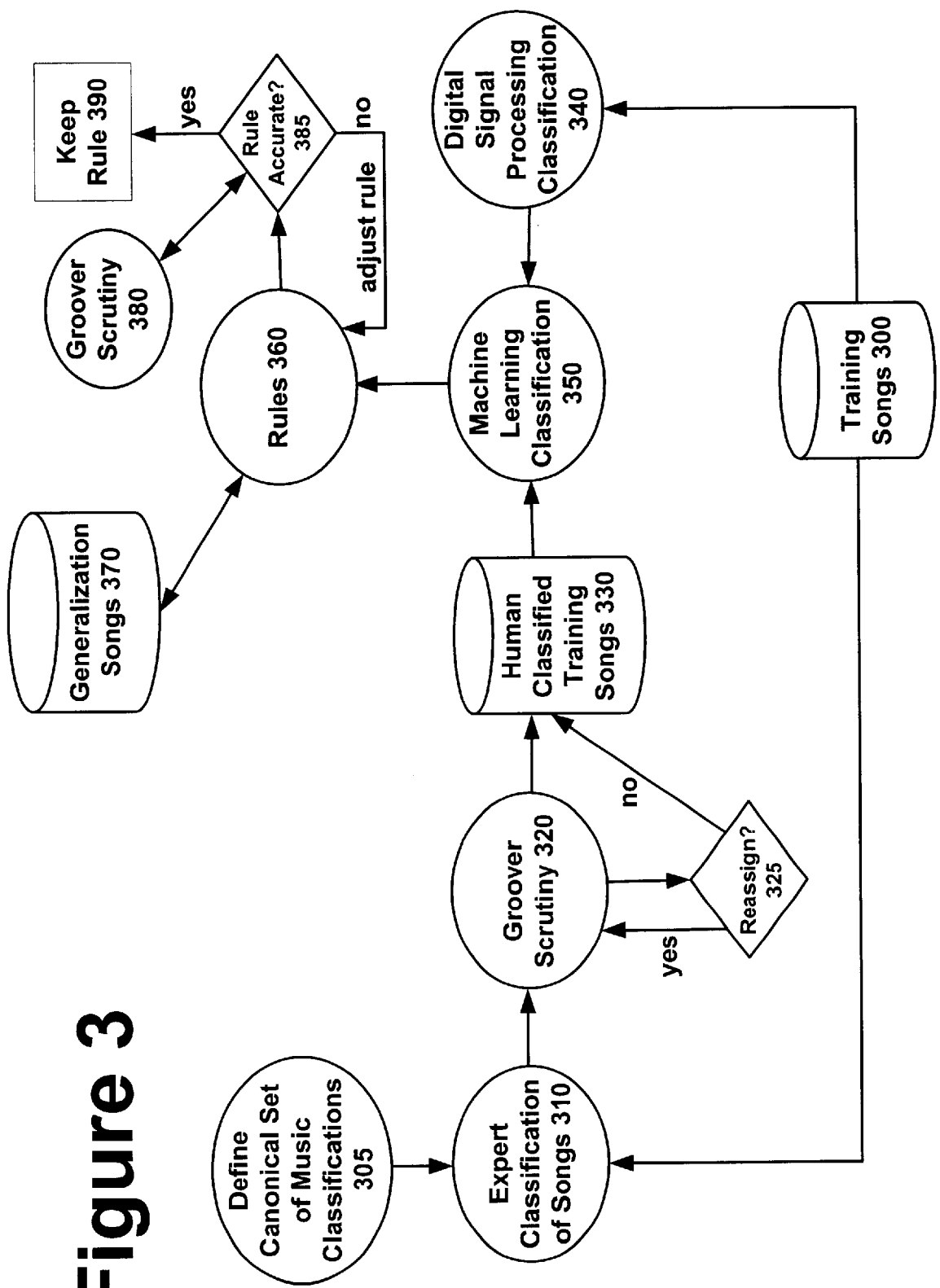
FIG. 3 is block diagram illustrating an exemplary method of the generation of general media classification rules from analyzing the convergence of classification in part based upon subjective and in part based upon digital signal processing techniques.

FIG. 3 illustrates an embodiment of the invention, which generates generalized rules for a classification system. A first goal is to train a database with enough songs so that the human and automated classification processes converge, from which a consistent set of classification rules may be adopted, and adjusted to accuracy. First, at 305, a general set of classifications are agreed upon in order to proceed consistently i.e., a consistent set of terminology is used to classify music in accordance with the present invention. At 310, a first level of expert classification is implemented, whereby experts classify a set of training songs in database 300. This first level of expert is fewer in number than a second level of expert, termed herein a groover, and in theory has greater expertise in classifying music than the second level of expert or groover. The songs in database 300 may originate from anywhere, and are intended to represent a broad cross-section of music. At 320, the groovers implement a second level of expert classification. There is a training process in accordance with the invention by which groovers learn to consistently classify music, for example to 92–95% accuracy. The groover scrutiny reevaluates the classification of 310, and reclassifies the music at 325 if the groover determines that reassignment should be performed before storing the song in human classified training song database 330.

Before, after or at the same time as the human classification process, the songs from database 300 are classified according to digital signal processing (DSP) techniques at 340. Exemplary classifications for songs include, inter alia, tempo, sonic, melodic movement and musical consonance characterizations. Classifications for other types of media, such as video or software are also contemplated. The quantitative machine classifications and qualitative human classifications for a given piece of media, such as a song, are then placed into what is referred to herein as a classification chain, which may be an array or other list of vectors, wherein each vector contains the machine and human classification attributes assigned to the piece of media. Machine learning classification module 350 marries the classifications made by humans and the classifications made by machines, and in particular, creates a rule when a trend meets certain criteria. For example, if songs with heavy activity in the frequency spectrum at 3 kHz, as determined by the DSP processing, are also characterized as 'jazzy' by humans, a rule can be created to this effect. The rule would be, for example: songs with heavy activity at 3 kHz are jazzy. Thus, when enough data yields a rule, machine learning classification module 350 outputs a rule to rule set 360. While this example alone may be an oversimplification, since music patterns are considerably more complex, it can be appreciated that certain DSP analyses correlate well to human analyses.

However, once a rule is created, it is not considered a generalized rule. The rule is then tested against like pieces of media, such as song(s), in the database 370. If the rule works for the generalization song(s) 370, the rule is considered generalized. The rule is then subjected to groover scrutiny 380 to determine if it is an accurate rule at 385. If the rule is inaccurate according to groover scrutiny, the rule is adjusted. If the rule is considered to be accurate, then the rule is kept as a relational rule e.g., that may classify new media.

The above-described technique thus maps a pre-defined parameter space to a psychoacoustic perceptual space defined by musical experts. This mapping enables content-based searching of media, which in part enables the automatic transmission of high affinity media content, as described below.

Matching Processing

The present invention relates generally associating closely related media entities using one ore more inherent characteristics of the media entities. In an illustrative implementation, the inventive concepts described herein may comprise on or more features for use in broadcasting or rendering of media from a network-enabled computing device, such as a radio, or a radio broadcast rendered via a network portal, such as a Web site. The matching process works to power one or more features for the above-described song analysis and matching system. Specifically, the present invention employs one more data sets having media content data (e.g. song data), and media entity characteristics (e.g. factor similarities matrices, characteristic scales, and characteristic weights) to pair down closely related media entities from a library of disparate media entities. One or more algorithms operate on these data sets to create one or more subsets of media entities having close relationships. In operation, the algorithms are applied to the data sets to generate a running scores so that media entities may be compared with each other on a media entity by media entity bases to quantitatively separate dissimilar media entities and associate similarly situated media entities.

Existing media matching processes to identify closely related media entities are very broad and have not specifically employed characteristics of the media itself when trying to create relevant associations, and hence cannot as effectively provide consistent and relevant matches between similarly situated media entities.

In connection with the above-described song analysis, classification and matching processes, the present invention provides advancements in the area of matching closely related media entities, that when implemented serve to power features and operations for media distribution systems offering to participating users that ability to retrieve one or more highly related media entity sets via only a small amount of effort. By lever aging the song analysis and matching techniques, users can accurately "ask" for music for which there will be high affinity. Using pre-defined media entity characteristics in one more weighting algorithms and processes, a library of media entities may be sorted into sets contained therein closely related and/or similarly situated media entities.

Figure 4:
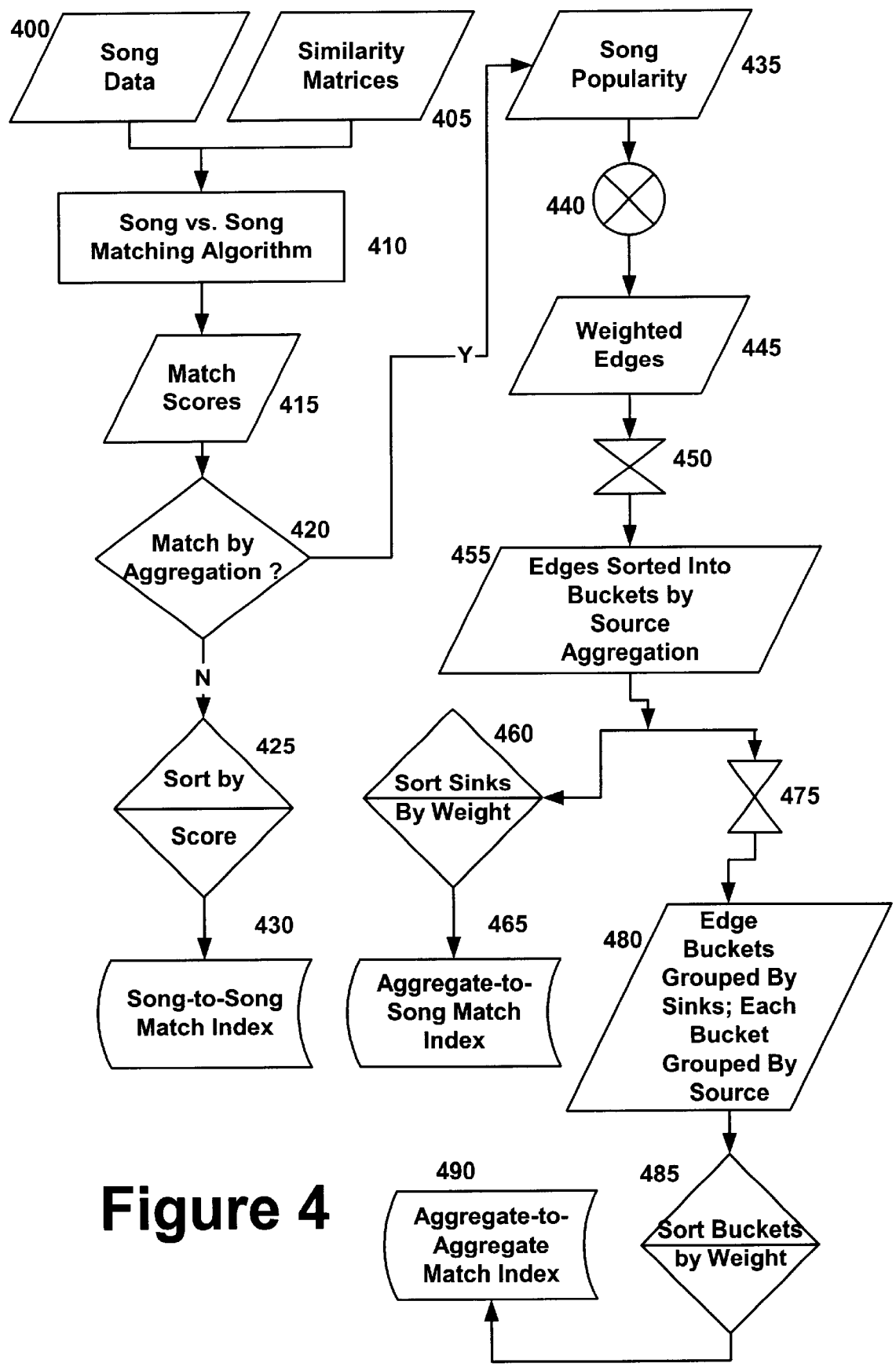
FIG. 4 is a flow diagram of the processing performed and data flow realized to perform matching of media elements in accordance with the present invention.
Figure 5:
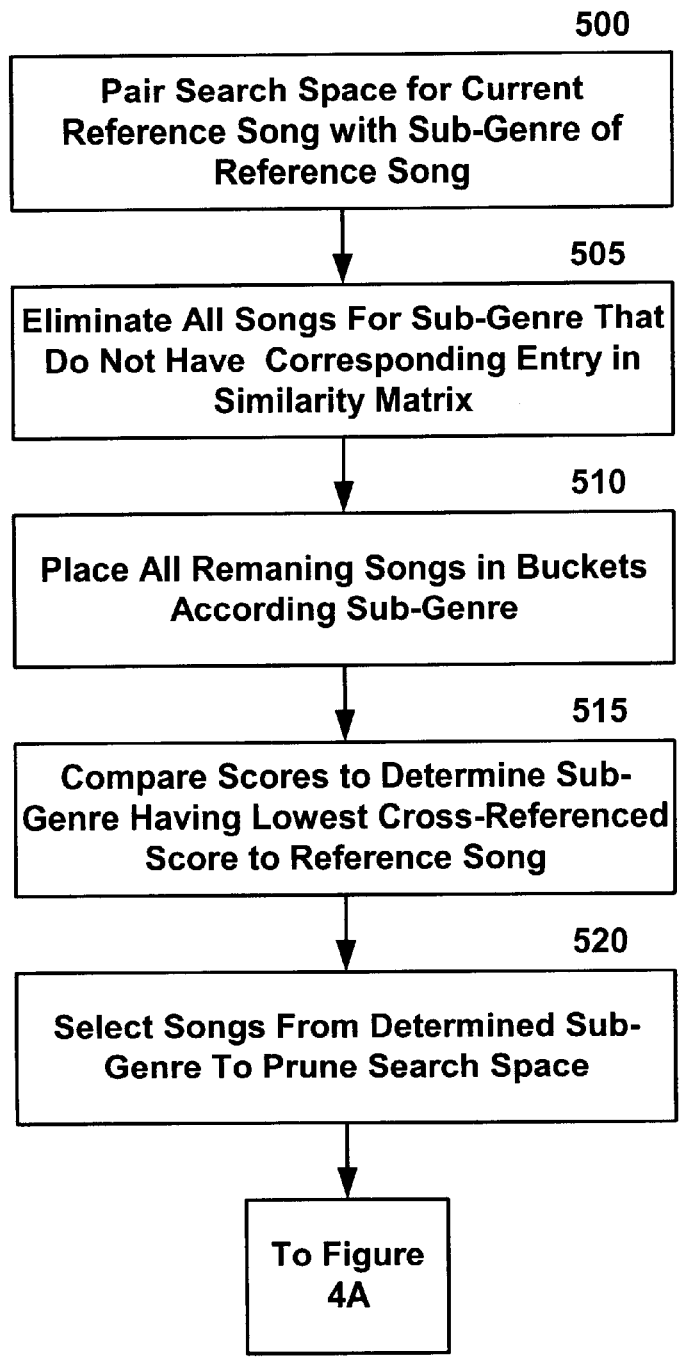
FIGS. 5 and 5A illustrates the processing of an exemplary algorithm to perform score-based matching for a song-to-song matching process in accordance with the present invention.
Figure 5A:
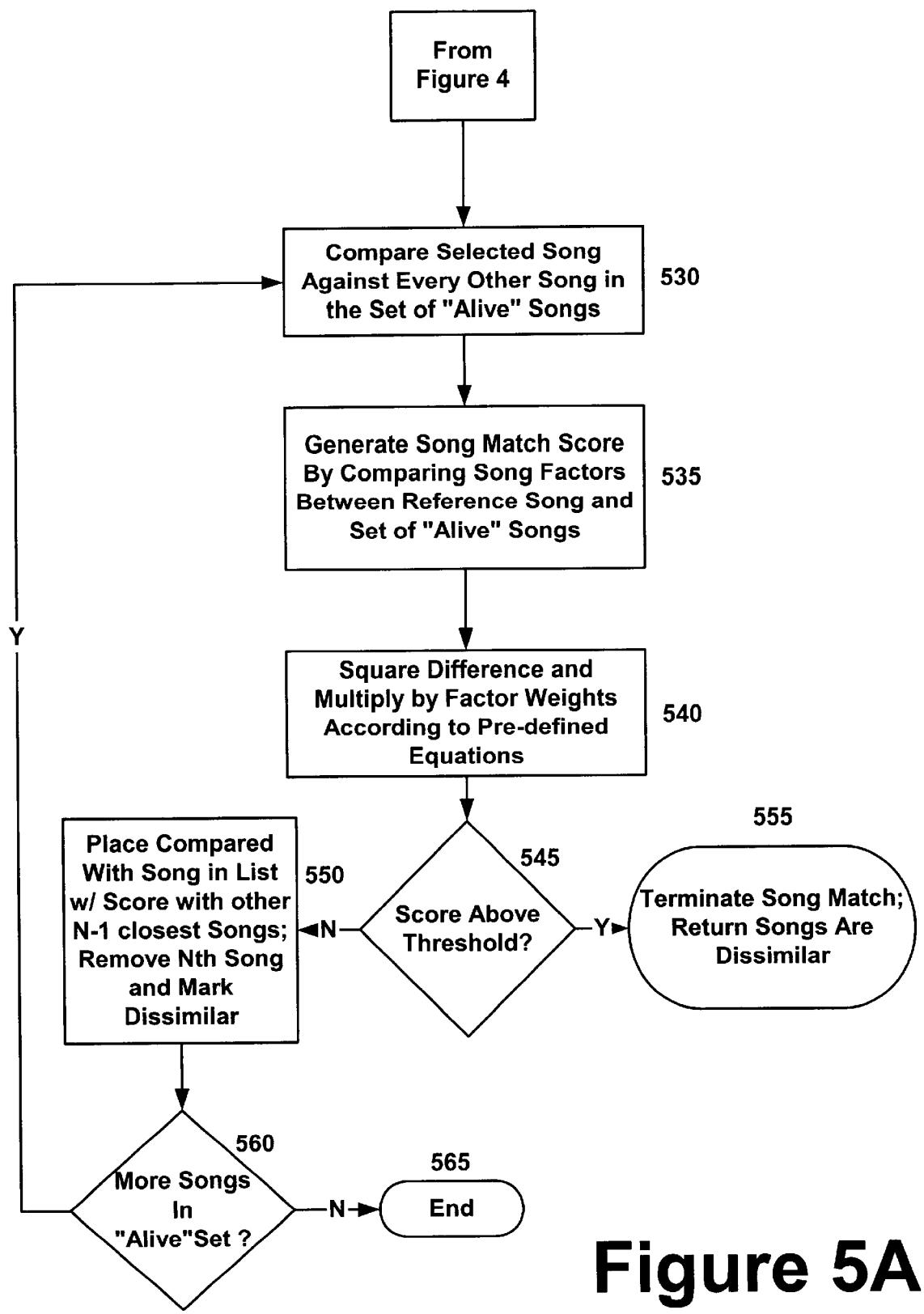

FIGS. 4 through 5A illustrate the processing that is performed to produce media entity sets having closely related media entities.

FIG. 4 shows the processing flow and data flow of the present invention to pair down a library of media entities (e.g. songs) to generate one or more sets of matched media entities using score matching and/or aggregation matching techniques. As shown, song data 400 and similarity matrices 405 act as input for song matching algorithm 410. Song matching algorithm (as further described by FIGS. 5 and 5A), operate on song data 400 and similarity matrices 405 to generate match scores 415. Match scores serve as a basis to quantify similarities between songs in song data set 405. Once the match scores are generated at 415, a check is performed at block 420 to determine if a match is to be performed using aggregation techniques. If aggregation is not to be used, processing proceeds to block 425 where the songs are sorted by score. The resultant set is song-to-song match index 430. Alternatively, if at block 425, match by aggregation is preferred, processing proceeds to block 435 where song popularity data set 435 is summed with weighted edges data set at summation block 440. The resultant data set is collated at block 450 to produce a resultant data set 445. Resultant data set 445 contains data elements where edges are sorted into buckets by source aggregation. Processing then proceeds to blocks 460 and block 475. At block 460, data set 455 is sorted so that the sinks are sorted by weight. The resultant set from sort 460 is aggregate-to-song match index data set 465. Concurrently, data set 455 is collated at block 475 to produce data set 480 where the edge buckets are grouped by sinks and each bucket is grouped by source. A sort is then performed at block 485 of data set 480 such that the buckets are sorted by weight. A resultant data set 490 is generated from sort 480 so that data set 490 contains an aggregate-to-aggregate match index. As a result, when performing aggregate matching aggregate-to-song match index data set 465 and aggregate-to-aggregate match index data set 490.

A number of data sets are used to execute matching algorithm of block 410. Specifically, song data set is employed. Prior to the matching process, each song is analyzed, and data is created which describes the intrinsic musical properties of the song. This data can either be a scaled number, which implies that the numeric designation has significant mathematical meaning, or the data can be an attribute whose number has no inherent meaning. In the second case, a data similarity matrix data set is required to mathematically assign a value to the relationship between two data values. The similarity data matrix may comprise various factors including but not limited to similarity driven factors (e.g. rhythm time, rhythm type, style, sub-genre, vocal voices, flavor, and mood), scale driven factors (emotion, density, weight, consonance, melodic movement, tempo, and rhythm activity).

In addition, the present invention contemplates the use of factor similarity matrices (e.g. inherent characteristic matrices). Generally, each non-scale driven data set has associated similarity matrices that describe the importance of that data in determining a song's musical affinity to another. These matrices are flexible. Each matrix driven factor has a base matrix used for most cases, but there are also specialized matrices for some factors based upon the style of the song being analyzed, or, alternatively, the historical preferences of the individual user.

Further, factor scales are employed. For data not associated via the data similarity matrices, the use of customized scales for each different factor are employed. In doing so, the difference between a score of 10 and 5 in emotion is made more or less significant than the difference between scores of an 8 and a 3, for instance. This architecture allows more flexibility in how to interpret the song data.

Lastly, factor weights are utilized in the matching process. Some musical factors are more important than others in determining musical affinity. Therefore, a table of factor weights is used to describe the relative importance of the individual song factors.

Matching algorithm of processing block 410 may be employed to find the closest set of songs in terms of musical affinity to one particular song. This algorithm is repeated for each song in order to create a complete rollup table for an exemplary library of songs. As such, the matching algorithm makes a massively parallel implementation feasible, the extreme of which would be one computing node per song.

In an illustrative implementation, the resulting values from the exemplary matching algorithm are pre-computed into a lookup table. In operation, the lookup table may be employed by a media content delivery computing application (e.g. a music content Web-site) to facilitate fast lookups of the song meta-data computed-by the matching algorithm. The exemplary matching algorithm may be employed to match a single song against a library of songs.

FIGS. 5 and 5A describe the processing performed by exemplary algorithm of processing block 410 when performing the single song match. As shown, in FIG. 5, processing begins at block 500 where the search space against which a given song (e.g. reference song) is pared according to the sub-genre of the reference song. A sub-genre comprises on of the similarity matrix driven factors and/or scale driven factors described above. The sub-genre of the song being matched is cross-referenced against the sub-genre similarity matrix to create a numerical score. For the sub-genres that do not have a corresponding entry in the similarity matrix, all songs in those sub-genres are eliminated from the search space at block 505. For the songs that remain, they are placed in buckets according to sub-genre at block 510. A comparison of the scores is then performed at block 515 to determine the sub-genre having the lowest cross-referenced score to the referenced song. The songs from this sub-genre are selected at bloc 520 to prune down the search space and to seed the matching process for greater efficiency.

Once the search space has been pruned, processing proceeds to block 530 of block FIG. 5A, where the song is now compared against every other song in the remaining alive set of songs (i.e. songs from the initial library of songs that survive processing steps 500–520. A song match score is kept for the comparison between the two songs at block 535. This comparison involves looping through each of the song factors listed above. For each factor, either the similarity value is looked up in the similarity matrix, or a value is computed using the factor scales (the default scale is linear difference). In the special case of song tempo, the relative difference between the two songs is measured, as opposed to using a simple scale. The resulting value in all three cases is then squared, and then multiplied by the factor weight at block 540. The following exemplary equations represent the processing performed to realize scorekeeping for song A (e.g. the song being matched against) and song B (e.g. a song in the search space).

Factor $\epsilon$ Matrix__driven $$score=score+factorweight[factor]*(similarity[factor](factorA, factorB))^2$$

Factor $\epsilon$ Scale__driven $$score=score+factorweight[factor]*(scale[factor](factorA)-scale[factor](factorB)^2$$

$factor = tempo$: $score =$ $$score + factorweight[factor] * \left( \frac{factorA - factorB}{factorA} * 100 \right)^2$$

As the score for the comparison between songs A and B is incremented, the score is compared against the best N scores seen so far at block 545. If the score goes above that threshold at any point, the comparison is terminated and songs A and B are marked as "non-similar" at block 555. If songs A and B are similar enough (i.e. they have a low enough score) then song B is placed in a list, along with its score, with the other (N–1) closest songs in terms of musical affinity at block 550. When a good match is found, the match that was previously marked as the N" best match is removed from this good match queue and marked as "non-similar". A check is performed at block 560 to determine if there are more songs to compare the reference song against. If there are no more songs for comparison, processing terminates at block 464. However, if the alternative proves true, processing reverts to block 530 and proceeds there from. The result of this processing is that only the closest N songs are stored because many songs may be thrown out after comparing the two or three most significant attributes, instead of cycling through them all. To efficiently implement the algorithm, the successfully matched (song, score) pairs may be stored in a priority queue (e.g. a specialized binary tree such as a heap). Once all of the songs in the search space have been compared, the remaining N best matches to that song are placed in a rollup table, ordered by song affinity (score) for efficient indexing from an exemplary Web application.

As described in FIG. 4, the present invention contemplates an alternative to score based matching, namely, aggregate matching. Relying on the score matches, the present invention contemplates a matching process to aggregate the results into more than just a media entity by media entity matching (e.g. song by song matching), but also artist to artist matching, or other aggregate forms of media entity matching. For example, the following matches are contemplated media entity to media entity (e.g. song to songs), author to authors, artist to artists, album to albums, user-selected media entities to media entities (e.g. songs to songs), artist to media entity (e.g. songs), album to media entities (e.g. songs), album to artist, and artist to album.

Aggregate matching may employ a node counting algorithm to perform desired matches for a given library of media entities. In an illustrative implementation, aggregate matching may be realized by generating a graph, having an edge connecting each media entity (e.g. song) that has a pre-defined range match to another media entity (e.g. top 50 match to another song). Each edge has a direction, going from the source (the media entity being matched against) to the sink (the second media entity, which "matches" the media entity). The set of media entities for a particular aggregation is examined after this. This set of media entities may be generated by processing steps 400–415 of FIG. 4. To achieve aggregation, the processed media entity data set should contain all the media entity to media entity data for all the media entities in the aggregation being queried. When processed, each edge is given a weight that is relative to its ranking, or other factor, such as, the source's general popularity. The popularity factor may be used to ensure that end-users observe aggregate matching based upon familiar songs from an artist or album. Comparatively, if popularity is not employed, obscure selections may be used resulting in a less than personal experience for the end-user.

In the exemplary algorithm, the weights of the edges are summed and categorized according to their sinks so that each media entity which acts as a sink gets at least one bucket. As a result, those media entities that match several of the aggregated songs will have multiple "edges" in their bucket. After summation of the edge weights, media entities with multiple edges will have much higher weights than others, and therefore "match" that aggregate of media entities better than others. This weighting is used to create the individual media entity affinities to the aggregation. For example, an artist or an album to which the reference media entity is being matched against. The result of the aggregation algorithm provides one or more media entities that have a close relationship to a particular classifier. For example, if an artist is provided as the classifier, the aggregation algorithm would provide a resultant data set having media entities that would have characteristics most similar to the provided artist (e.g. if the media entity is a song the aggregation algorithm would provide a resultant data set having songs the would sound most similar to the provided artist).

In addition, aggregations of media entities on either side of the match process may be performed by the present invention. For example, an aggregation may be performed to match one artist to other artists, the data first generated by the aggregation algorithm is aggregated once more to obtain similarly situated artists (e.g. similarly sounding artists).

As mentioned above, the media contemplated by the present invention in all of its various embodiments is not limited to music or songs, but rather the invention applies to any media to which a classification technique may be applied that merges perceptual (human) analysis with acoustic (DSP) analysis for increased accuracy in classification and matching.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of music data, one skilled in the art will recognize that the present invention is not limited to the music, and that the methods of tailoring media to a user, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for selecting media entities that closely relate to a reference media entity from a data set having at least one media entity comprising the steps of:

producing media entities match scores for said at least one media entity of said data set by comparing media entity affinity data of reference song with media affinity data of said at least one media entity of said data set, wherein said media affinity data comprises at least one factor from a similarity matrix;

storing media entity match scores for media entities having scores nearest the score to the reference media entity for selecting the closest set of media entities to said reference media entity; and generating a resultant data set of media entities using said produced and stored match scores, wherein said resultant data set containing closely related media entities to said reference media entity.

2. The method as recited in claim 1, wherein the producing step further comprising the step of pruning down said data set having at least one media entity using sub-genre factors to eliminate dissimilar media entities from being processed in said selection method.

3. The method as recited in claim 2, further comprising the steps of determining at least one sub-genre for said reference media entity and comparing said sub-genre with said sub-genre factors of said at least one media of said data set, said sub-genre factors comprising at least one of rhythm time, rhythm type, style, vocal voices, flavor, mood, emotion, density, weight, consonance, melodic movement, tempo, or rhythm activity.

4. The method as recited in claim 3, further comprising the step of applying at least one scoring-based algorithm on said data set having said at least one media entity to produce said matching scores, said algorithm employing said sub-genre factors to produce said matching scores.

5. The method as recited in claim 1, wherein said producing step further comprises the step of performing a look-up on at least one similarity matrix to obtain said matching score.

6. The method as recited in claim 1, further comprising the step of associating N number of media entities having the closest relationship based on said matching scores with said reference media entity.

7. The method as recited in claim 1, further comprising the step of producing a roll-up table, said roll-up table having at least one look-up index to facilitate searching of similarly matched songs.

8. The method as recited in claim 1, further comprising the step of performing aggregate matching to produce a data set of matched media entities matched at least one combination of various media entity characteristics, said characteristics comprising at least one of media entity author, media entity title, or user-defined search parameters.

9. The method as recited in claim 8, wherein aggregate matching further comprises the steps of:
  creating a graph with an edge connecting each media entity having a pre-determined range of match to another media entity, wherein each edge has a direction going from a source (the media entity being matched against) to the sink (the second media entity, which matches the first media entity);
  assigning a weight to each edge relative to its ranking within said range;
  summing the edge weights; and
  categorizing said summed edge weights for said media entities according to their sinks.

10. A computer readable medium bearing computer executable instructions for carrying out the method of claim 1.

11. A modulated data signal carrying computer executable instructions for carrying out the method of claim 1.

12. A computing device comprising means for carrying out each of the steps of the method of claim 1.

13. A system for matching media entities to provide associations between closely related media entities comprising:
  a scoring system that accepts as input data sets representative of media entity data and similarity matrices data, wherein said scoring system applies at least one weighting algorithm on said media entity data and said similarity matrices data to calculate matched scores, said algorithm employing inherent media element characteristics when calculate said matched scores; and
  a data store cooperating with said scoring system to store said matched scores for media entities having scores nearest the score to a selected reference media entity.

14. The system as recited in claim 13, further comprising an aggregation system, said aggregation system employing at least one node counting algorithm to assign weights to media entities, wherein said media entities are sorted according to said assigned weights to create associations between relevant and closely related media entities.

15. The system as recited in claim 14, wherein said at least one node counting algorithm creates a graph with an edge connecting each media entity having a pre-determined range of match to another media entity, wherein each edge has a direction going from a source (the media entity being matched against) to the sink (the second media entity, which matches the first media entity), assigning a weight to each edge relative to its ranking within said range, summing the edge weights, and categorizing said summed edge weights for said media entities according to their sinks.

16. The system as recited in claim 13, wherein said media element characteristics comprise at least one of rhythm time, rhythm type, style, vocal voices, flavor, mood, emotion, density, weight, consonance, melodic movement, tempo, or rhythm activity.

17. The system as recited in claim 13, wherein said data store stores said media elements in a roll-up table having at least one index that is accessible by participating users.

18. The system as recited in claim 13, wherein said scoring system compares a reference media entity to a library of media entities, said reference entity being compared to said library of media entities using media entity characteristics to calculate said matched scores, said scoring system associating media entities as closely related if said calculated matched score is below a pre-defined threshold score.

19. The system recited in claim 13, further comprising a communications network cooperating with said scoring system and said data store to communicate data representative of matched media entities and media entities to participating users, said communications network comprising any of a fixed-wire public network, a wireless public network, a fixed wire private network, and a wireless private network.

20. A method to enhance the experience of participating users of a media entity distribution system comprising the steps of:
  providing a library of media entities;
  applying media entity matching processes on said library of media elements to create associations between the media entities of said library using inherent characteristics of said media elements, wherein said media entity matching processes employ at least one of a score-based matching or node counting matching;
  storing for distribution said associations in a roll-up table having one or more indices, said roll-up table provided to said participating users.

* * * * *